Sept. 9, 1958  J. GERICK  2,850,782
INTERRUPTED THREAD TYPE FASTENERS
Filed July 20, 1953
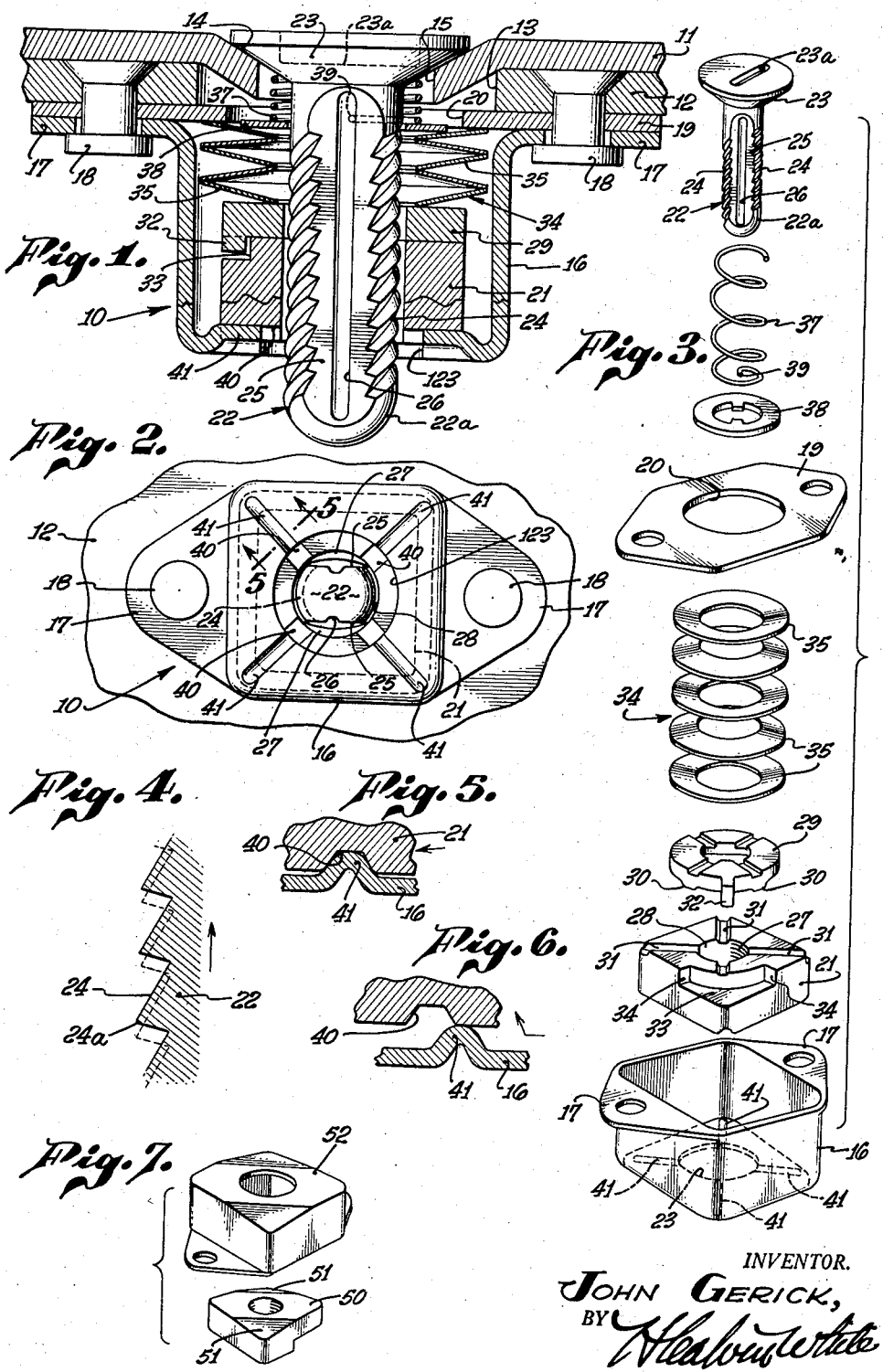
INVENTOR.
JOHN GERICK,
BY
ATTORNEY.

United States Patent Office 2,850,782
Patented Sept. 9, 1958

2,850,782
INTERRUPTED THREAD TYPE FASTENERS

John Gerick, Los Angeles, Calif., assignor, by mesne assignments, to Airtek Dynamics, Inc., Los Angeles, Calif., a corporation of California Application July 20, 1953, Serial No. 369,113
2 Claims. (Cl. 24—221)

This invention has to do with improvements in fastening devices of the type usable in airplane and other structures where it is desirable that a pair of work parts be capable of quick interconnection and disconnection. Typically, fasteners of this kind, known as a quick make and break type, are used for interconnection of inner and outer work sections such as overlapping metallic sheets or panels. More particularly, the invention is directed to improvements in fasteners comprising a nut part attachable to one, e. g. an inner, of the work parts or sheets, and a stud part engageable against the other or outer work part or sheet, the stud and nut having interrupted threads so that the stud is receivable by axial movement into the nut and is threadedly engageable therewith upon rotation.

The invention will be described typically as embodied in a fastener structure in which the nut part or assembly is connected to an inner work section and the stud head is engageable against the outer work section by insertion of the stud through an opening therein registering with the nut bore. The nut assembly, in this illustrative form, may be further characterized as comprising a receptacle for the nut and within which the nut is rotatable, a detenting means operable to releasably retain the nut in predetermined angular positions relative to the stud, and a spring engaging the detenting device against the nut. As indicated, the quick make and break characteristic of the fastener results from interruption of the stud and nut threads, preferably at opposite sides of the thread circle, so that upon axial insertion of the stud into the nut, the interrupted nut threads are simultaneously engageable and mated with the stud threads upon rotation of the latter. A problem has existed, however, in attempting to assure proper registration or mating of the stud and nut threads upon rotation of the stud. Because of practical considerations, it is not feasible to attempt to limit the fully inserted position of the stud to such nicety of relation to the nut, as to assure a practicably exact mating of the threads, and of course if the threads do not interengage or mate, the stud either will not rotate into the nut or must require some manipulation axially to arrive at a mating position of the threads. If required, such manipulation would be impractical.

One proposal made to overcome this condition and assure mating of the threads has been to give such curvatures to the faces of the thread terminals as will more readily assure reception of one set of threads between the other, and then by an essentially caming action, ultimately bring about full mating of the threads as the stud is rotated to its fully locked position. This proposal, though workable, is found to have disadvantages, the first being the added cost and unusual machining techniques required for giving the cam shape to the threads, and secondly that forming the threads with these caming curvatures deprives the threads of full interengagement throughout their complete arcuate extents, and thereby materially reduces the strength of the fastener in tension, below the strength that it would have, all other conditions being the same, with full interengagement of the threads throughout their extents.

The present invention has for its general object to eliminate all such limitations by assuring in a simple and practical manner involving no consequential added expense or machining operations other than those involved merely in forming the interrupted threads, proper mating of the threads in response to rotation of the stud, and permitting full interengagement of the threads throughout their arcuate extents in the made-up condition of the fastener.

This object is accomplished, generally speaking, by accommodating the nut for both limited rotational movement and axial displacement relative to the stud, and so governing the nut displacement that in the event of misalinement of the stud and nut threads upon turning of the stud, rotation imparted to the nut by the stud effects a gradual relative axial displacement of the stud to a position at which the threads axially aline and the stud threads may then enter between the nut threads.

In accordance with the particular structural characteristics of the embodiment hereinafter described, the nut assembly may comprise a receptacle attached to the inner work section and containing the nut for limited rotation therein by the stud. Axial displacement of the nut in response to rotation of the stud may be effected most simply by forming in the receptacle and on an end face of the nut, interengaging relatively angular or cam surfaces which cause the nut upon its rotation, to shift axially of the stud. Since only slight displacement of the nut is required to assure mating of the threads, the nut movement may be readily and accurately accomplished by limited angular rotation of the stud. As will appear, associated with the nut may be a detenting device acting to releasably retain the nut in predetermined positions of rotation relative to the stud.

All the above mentioned features and objects of the invention, as well as the details of a typical embodiment, will be understood more fully from the following detailed description of the accompanying drawing, in which:

Fig. 1 is an axial sectional view of the fastener assembly, the stud appearing in side elevation;

Fig. 2 is a bottom plan view of Fig. 1;

Fig. 3 is a view showing in perspective all the parts of the fastener structure in the order in which they are associated in the assembly;

Fig. 4 is a diagrammatic view illustrative of the nut thread displacement;

Figs. 5 and 6 are fragmentary enlarged sections taken on line 5—5 of Fig. 2, illustrating the camming displacement of the nut; and Fig. 7 is a view showing in perspective a variational form of nut and receptacle.

Referring first to Fig. 1, the fastener assembly, generally indicated at 10, is shown typically to be used for releasably interconnecting a pair of metallic panels or sheets 11 and 12, the latter containing an opening 13 and sheet 11 containing within the countersink 14 an opening 15 axially alined with opening 13.

Fastener assembly 10 may comprise typically a cup-shaped receptacle 16 having opposed ears 17 attachable to the work member 12 by rivets 18, the interconnection between the work part and receptacle usually being made through a spacer plate 19 having a central opening 20. Preferably the receptacle is of polygonal shape, see Fig. 3, and contains a nut 21 also of polygonal cross-section so as to be capable of limited rotation within the receptacle. A stud 22 having a tapered head 23 seating within the countersink 14 preferably extends through the nut and a bottom opening 123 in the receptacle, the stud being releasably engaged with the nut in a quick make and break threaded association.

Referring more particularly to the stud 22, a shank 22a is threaded throughout the major extent of its length, the threads 24 preferably being of standard V form and having a lead and pitch in the order of that usually employed in fasteners of this general type. The stud threads are interrupted at their intersections with plane surfaces or flats 25 on diametrically opposed sides of the shank, and in contemplation of the above mentioned objects of the invention concerning the economy and simplicity of the thread formation and interruption, the thread discontinuity may result simply from machining off the stud sides to the flats 25, leaving the threads with the resultant terminal shapes at the points of intersection with the flats. As will appear, for accommodation of the ejector spring terminal, one or both of the stud flats may contain a longitudinal recess 26 extending substantially throughout the length of the stud.

The nut 21 similarly is formed with diametrically opposed thread series 27, see Fig. 3, interrupted by intervening unthreaded or smooth extents 28 of the nut bore, so that the stud threads 24 are receivable by axial movement of the stud into the nut and between its threads 27 and the nut and stud threads are then mateable upon right-hand rotation of the stud as by a driver inserted within its head slot 23a. Engaged against the top of the nut is a detenting disc 29 carrying on its underface projections 30 receivable within recesses 31 in the nut to establish a detenting action whereby the disc 29, and through it the stud 22, are releasably held to the nut at quarter turn intervals. The disc 29 also carries a stop projection 32 receivable within a recess 33 in the nut and engageable at its terminal shoulders 34 to limit the rotative range of the disc in relation to the nut. The disc has a non-circular central opening through which the stud is inserted and corresponding to the cross-sectional shape of the shank 22a so that the disc rotates with the stud. A spring 34 of the type comprising a series of frustro-conical annular pieces 35 is confined between the spacer 19 and disc 29 to urge the latter against the nut and also to urge the nut at 36 against the bottom of the receptacle 16.

Where provision is desired for partial ejection of the stud upon its release from the nut, the fastener assembly may include an ejector coil spring 37 bearing upwardly against the head 23 and supported at its lower end on a washer 38 bearing upon the spring 34. As more fully developed in the copending Frank A. Pachmayr application Serial No. 368,995, filed July 20, 1953, on "Fastening Device," spring 37 has a bottom inwardly turned terminal 39 received within the stud recess 26.

Coming now to the matter of effecting alinement and mating of the stud and nut threads, and with which the invention is more particularly concerned, it will be apparent that if by chance the stud and nut threads are not rather exactly alined at the fully inserted or seating position of the stud in relation to the nut, the thread terminals will abut and rotation of the stud simply will be resisted by the nut threads. The invention contemplates a simple provision whereby rotation of the stud produces such relative axial displacement of the nut as will assure perfect alinement and mating of the threads. Referring to Fig. 2, the nut 21 has on its bottom surface circularly spaced recesses 40, typically four in number, which receive and having camming relation with similarly arranged projections 41 on the inside surface of the receptacle 16, see Figs. 5 and 6. Initially, i. e. in the unlocked condition of the stud, the nut recesses and receptacle projections will interengage in the position shown in Fig. 5. If the stud and nut threads happen to mesh exactly when the nut is in the Fig. 5 position (and the stud is fully inserted), then the stud threads can of course be freely turned into interengagement with the nut threads, without any necessity for axial shifting movement of the nut from the Fig. 5 position. If, however, the stud and nut threads are not exactly alined in the Fig. 5 position of the nut, then the initial rotary movement of the stud in a locking direction acts to correspondingly rotate the nut for a short distance, and this rotation acts to cam the nut axially toward the Fig. 6 position by virtue of the camming surfaces 40 and 41 on the nut 21 and receptacle 16. When this camming action has reached a point at which the nut threads are aligned with the stud threads, then continued rotation of the stud will of course rotate the stud relative to the nut and thus move the stud threads into mesh with the nut threads. The initial or released position of the stud, and its final position when fully turned and locked in the nut, are of course established by the detenting action of the disc 29 and its quarter turn relation to the nut.

Fig. 7 illustrates a variational form of the invention representing a modification of the camming shapes on the nut and receptacle faces. In the view the parts are inverted to more clearly show their bottom configurations. Here the nut 50 has its bottom surface beveled at 51 from the center of the nut body toward opposite corners, the bottom 52 of the receptacle being correspondingly shaped so that upon turning within the receptacle, the nut is cammed bodily along the stud as previously.

I claim:

1. A fastener comprising a tubular receptacle adapted to be secured at one end to the inner one of a pair of inner and outer work members to be joined to the fastener, a rotatable headed stud insertable into the receptacle through an opening in the outer work member, a rotatable and axially displaceable nut contained within the receptacle, the shank of said stud carrying diametrically opposed interrupted screw thread series receivable between and rotatable into and out of mating engagement with correspondingly arranged interrupted screw thread series in the nut, said nut being free for limited rotary movement by and with the stud relative to the receptacle if the stud is turned in a locking direction when the stud and nut threads are not in mating alignment, cam means acting during and by virtue of said rotary movement of the nut with the stud to cam the nut axially relative to the receptacle until the nut and stud threads are in alignment so that further rotation of the stud can then mesh its threads with those of the nut in holding relation, and a spring resisting such camming of the nut, said cam means comprising interengaging cam faces on the nut and receptacle.

2. A fastener comprising a tubular receptacle adapted to be secured at one end to the inner one of a pair of inner and outer work members to be joined by the fastener, a rotatable headed stud insertable into the receptacle through an opening in the outer work member, a rotatable and axially displaceable nut contained within the receptacle, the shank of said stud carrying diametrically opposed interrupted screw thread series receivable between and rotatable into and out of mating engagement with correspondingly arranged interrupted screw thread series in the nut, a disc rotatable with the stud and having detenting engagement with one end face of the nut, a spring urging said disc against the nut, said nut being free for limited rotary movement by and with the stud relative to the receptacle if the stud is turned in a locking direction when the stud and nut threads are not in mating alignment, and cam means acting during and by virtue of said rotary movement of the nut with the stud to cam the nut axially relative to the receptacle until the nut and stud threads are in alignment so that further rotation of the stud can then mesh its threads with those of the nut in holding relation, said cam means comprising interengaging cam faces on the other end of the nut and said receptacle.

References Cited in the file of this patent

UNITED STATES PATENTS

| | | |
|---|---|---|
| 1,614,815 | Wilson | Jan. 18, 1927 |
| 2,323,260 | Venditty | June 29, 1943 |
| 2,410,441 | Hattan | Nov. 5, 1946 |
| 2,420,733 | Cannova | May 20, 1947 |
| 2,434,876 | Warren | Jan. 20, 1948 |